(12) United States Patent
Langhammer

(10) Patent No.: US 9,575,725 B1
(45) Date of Patent: Feb. 21, 2017

(54) SPECIALIZED PROCESSING BLOCK WITH EMBEDDED PIPELINED ACCUMULATOR CIRCUITRY

(71) Applicant: Altera Corporation, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 379 days.

(21) Appl. No.: 14/218,113

(22) Filed: Mar. 18, 2014

(51) Int. Cl.
*G06F 7/485* (2006.01)

(52) U.S. Cl.
CPC .................... *G06F 7/485* (2013.01)

(58) Field of Classification Search
None
See application file for complete search history.

(56) References Cited

U.S. PATENT DOCUMENTS

| | | | |
|---|---|---|---|
| 4,825,400 A * | 4/1989 | Simoncic | G06F 7/485 708/505 |
| 4,841,467 A | 6/1989 | Ho et al. | |
| 5,053,631 A | 10/1991 | Perlman et al. | |
| 5,630,160 A * | 5/1997 | Simpson | G06F 7/026 340/146.2 |
| 7,225,216 B1 * | 5/2007 | Wyland | G06F 7/483 708/501 |
| 7,543,013 B2 | 6/2009 | Du et al. | |
| 2002/0002573 A1 * | 1/2002 | Landers | G06F 7/49 708/501 |
| 2003/0154227 A1 * | 8/2003 | Howard | G06F 7/485 708/495 |

* cited by examiner

*Primary Examiner* — Michael D Yaary
(74) *Attorney, Agent, or Firm* — Treyz Law Group, P.C.; Jason Tsaic

(57) ABSTRACT

A specialized processing block on an integrated circuit is provided that performs pipelined floating-point accumulation operations. The specialized processing block may be configured to perform one accumulation operation and produce the result of the accumulation at every other clock cycle. Alternatively, the specialized processing block may be configured to perform two independent accumulation operations and produce the result of each of the accumulation operations alternating at consecutive clock cycles. The specialized processing block may include a dedicated three-input floating-point adder circuit. The specialized processing block may also fuse two independent two-input floating-point adder circuits to be configurable as two independent two-input floating-point adders or one three-input floating-point adder.

24 Claims, 8 Drawing Sheets

US 9,575,725 B1

SPECIALIZED PROCESSING BLOCK WITH EMBEDDED PIPELINED ACCUMULATOR CIRCUITRY

BACKGROUND

This invention relates to integrated circuits and, more particularly, to a specialized processing block with embedded pipelined floating-point accumulator circuitry in an integrated circuit.

Every transition from one technology node to the next technology node has resulted in smaller transistor geometries and thus potentially more functionality implemented per unit of integrated circuit area. Synchronous integrated circuits have further benefited from this development as evidenced by reduced interconnect and cell delays, which has led to performance increases. However, more recent technology nodes have seen a significant slow-down in the reduction of delays and thus a slow-down in the performance increase.

Solutions such as register pipelining have been proposed to further increase the performance. During register pipelining, additional registers are inserted between synchronous elements, which lead to an increase in latency at the benefit of increased clock frequencies and throughput. However, performing register pipelining often involves spending significant time and effort because several iterations of locating performance bottlenecks, inserting or removing registers, and compiling the modified integrated circuit design are usually required.

In recent years, floating-point operations are often being used instead of fixed-point operations because of the increased precision. Situations frequently arise where the floating-point operation which is implemented in a specialized processing block becomes the performance bottleneck of an application and register pipelining may increase the performance of some applications. However, pipelining may be problematic for specialized processing blocks with floating-point operations that are executed in a loop such as a floating-point accumulation operation, and the pipelining of a floating-point accumulator often requires a significant amount of additional logic, memory circuitry, and complex control structures.

SUMMARY

Embodiments relate to integrated circuits and, more particularly, to a specialized processing block with embedded pipelined floating-point accumulator circuitry in an integrated circuit. The pipelined floating-point accumulator circuitry may include a pipelined floating-point adder and an accumulation register stage.

The pipelined floating-point adder may compute a pipelined floating-point sum of first, second, and third floating-point numbers each having an exponent and a mantissa of a given precision at first, second, and third adder inputs and provide the pipelined floating-point sum at an adder output. The accumulation register stage may be coupled between the adder output and the third adder input and store the pipelined floating-point sum.

The pipelined floating-point accumulator circuitry may include an additional accumulation register stage and a control circuit. The additional accumulation register stage may receive an additional pipelined floating-point sum from the adder output and store the additional pipelined floating-point sum. The control circuit may be coupled to the accumulation register stage and the additional accumulation register stage and enable access to the accumulation register stage at a first duration of time and to the additional accumulation register stage at a second duration of time which is different than the first duration of time.

It is appreciated that the present invention can be implemented in numerous ways, such as a process, an apparatus, a system, a device, and instructions on a computer readable medium. Several inventive embodiments of the present invention are described below.

In certain embodiments, the pipelined floating-point accumulator circuitry may include a clock input that receives a clock signal having a clock period and a select signal generator circuit that receives the clock signal from the clock input and generates a select signal based on the clock signal. If desired, a multiplexer may be coupled between the accumulation register stage, the additional accumulation register stage, and the third adder input. The multiplexer may receive the select signal from the select signal generator circuit, the pipelined floating-point sum from the accumulation register stage, and the additional pipelined floating-point sum from the additional accumulation register stage and select between the received floating-point sums based on the select signal.

In other cases, the pipelined floating-point accumulator circuitry may further include an input selection circuit coupled to the first and second adder inputs. The input selection circuit may receive the select signal and a plurality of floating-point numbers. The input selection circuit may select two floating-point numbers of the plurality of floating-point numbers based on the select signal and convey the selected two floating-point numbers to the first and second adder inputs.

Further features of the invention, its nature, and various advantages will be more apparent from the accompanying drawings and the following detailed description of the preferred embodiments.

DETAILED DESCRIPTION

Embodiments relate to integrated circuits and, more particularly, a specialized processing block with embedded pipelined floating-point accumulator circuitry in an integrated circuit is described.

As mentioned above, floating-point (FP) operations are increasingly being used instead of fixed-point operations because of the increased precision. Situations may arise where a floating-point operation which is often implemented in a specialized processing block becomes the performance bottleneck of an application. Register pipelining, which inserts additional registers between synchronous elements, may lead to an increase in latency at the benefit of increased clock frequencies and throughput.

However, register pipelining may be problematic for specialized processing blocks that implement floating-point operations that are executed in a loop such as the floating-point accumulation operation, and the pipelining of a specialized processing block that implements a floating-point accumulation operation often requires a significant amount of additional logic, memory circuitry, and complex control structures.

It may be desirable to implement a pipelined specialized processing block that may be configurable to implement a wide variety of floating-point arithmetic functions in order to share some of the overhead for a pipelined floating-point accumulator function with other pipelined floating-point arithmetic functions (e.g., sum of three floating-point numbers or two independent sums of two floating-point numbers).

It will be obvious to one skilled in the art, that the present exemplary embodiments may be practiced without some or all of these specific details. In other instances, well-known operations have not been described in detail in order not to unnecessarily obscure the present embodiments.

Figure 1A:
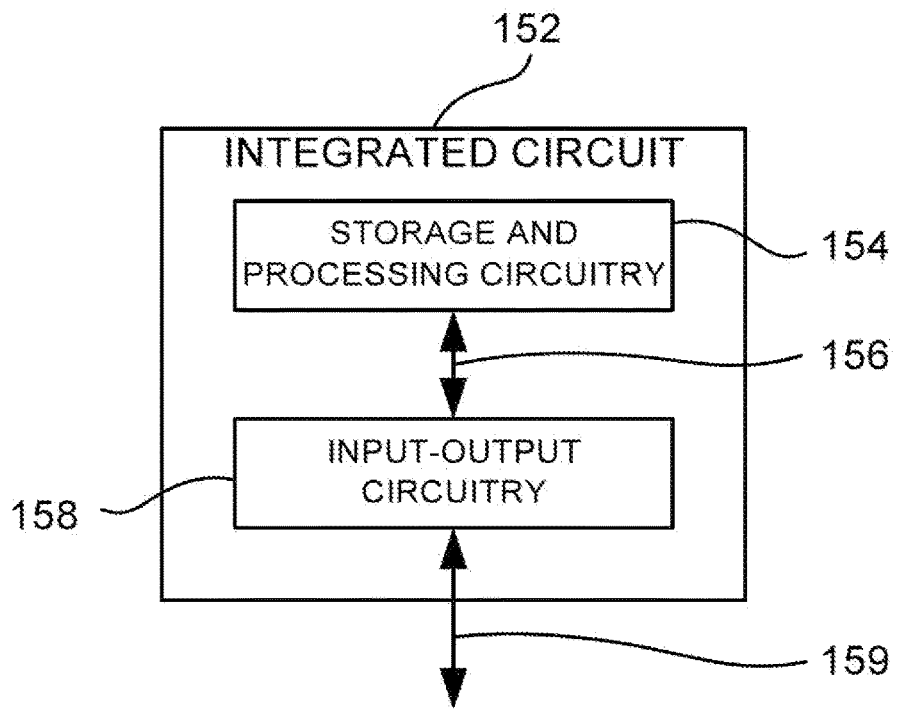
FIG. 1A is a diagram of an illustrative integrated circuit in accordance with an illustrative embodiment of the present invention.

An illustrative embodiment of an integrated circuit 152 in accordance with the present invention is shown in FIG. 1A.

Integrated circuit 152 may include storage and processing circuitry 154 and input-output circuitry 158. Storage and processing circuitry 154 may include embedded microprocessors, digital signal processors (DSP), microcontrollers, or other processing circuitry. The storage and processing circuitry 154 may further have random-access memory (RAM), first-in first-out (FIFO) circuitry, stack or last-in first-out (LIFO) circuitry, read-only memory (ROM), or other memory elements.

Input/output circuitry 158 may include parallel input/output circuitry, differential input/output circuitry, serial data transceiver circuitry, or other input/output circuitry suitable to transmit and receive data. Internal interconnection resources 156 such as conductive lines and busses may be used to send data from one component to another component or to broadcast data from one component to one or more other components.

Internal interconnection resources 156 may also include network-on-chip (NoC) or other on chip interconnection resources. External interconnection resources 159 such as conductive lines and busses, optical interconnect infrastructure, or wired and wireless networks with optional intermediate switches may be used to communicate with other devices.

Figure 1B:
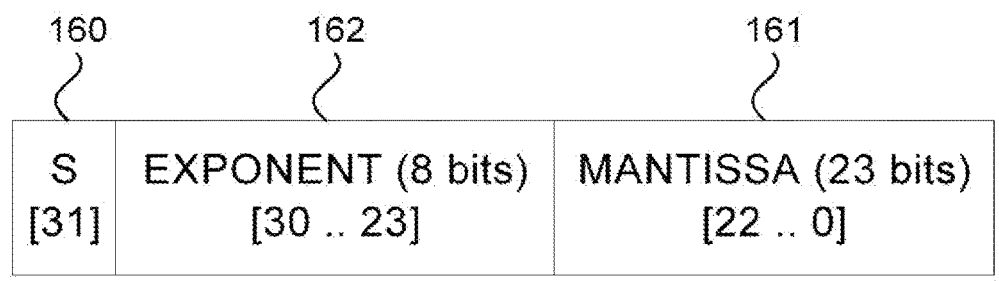
FIG. 1B is a diagram of an illustrative single precision floating-point number in accordance with an illustrative embodiment of the present invention.

Floating-point numbers are commonplace for representing real numbers in scientific notation in computing systems and are designed to cover a large numeric range and diverse precision requirements. The IEEE754 standard is commonly used for floating-point numbers. A floating-point number, such as the floating-point number illustrated in FIG. 1B includes three different parts: the sign of the floating-point number 160, the mantissa 161, and the exponent 162. Each of these parts may be represented by a binary number and, in the IEEE754 format, have different bit sizes depending on the precision. For example, a single precision floating-point number such as the floating-point number in FIG. 1B requires 32 bits, which are distributed as follows: one sign bit (bit 31), eight exponent bits (bits [30:23]), and 23 mantissa bits (bits [22:0]). A double precision floating-point number requires 64 bits including one sign bit (bit 63), 11 exponent bits (bits [62:52]), and 52 mantissa bits (bits [51:0]).

According to the IEEE754 standard, a mantissa may also have additional bits. A mantissa that has additional bits is sometimes also referred to as an extended mantissa. For example, an extended, single precision mantissa may have five additional bits (i.e. an extended, single precision mantissa may consist of 28 bits instead of 23 bits). The last three bits added to the right of the least significant bit may represent round, guard, and sticky bits.

Round and guard bits may provide additional accuracy when performing arithmetic operations. For example, dividing a mantissa with a '1' in the least significant bit position by two may result in the round bit to become '1'. An additional division by two may result in the guard bit to become '1'. Thus, round and guard bits enable the representation of numbers that are smaller than a mantissa without these additional bits may be able to represent accurately. The sticky bit may record any bits of value '1' that are shifted beyond the precision of the mantissa by performing a logical OR operation with the round and guard bits.

The two remaining bits are added beyond the most significant bit position and may absorb any overflow produced by a floating-point arithmetic operation.

The sign of a floating-point number according to standard IEEE754 is represented using a single bit, where a "0" denotes a positive number and a "1" denotes a negative number.

The exponent of a floating-point number preferably is an unsigned binary number which, for the single precision format, ranges from 0 to 255. In order to represent a very small number, it is necessary to use negative exponents. Thus, the exponent preferably has a negative bias. For single precision floating-point numbers, the bias preferably is −127. For example a value of 140 for the exponent actually represents (140−127)=13, and a value of 100 represents (100−127)=−27. For double precision numbers, the exponent bias preferably is −1023.

As discussed above, according to the IEEE754 standard, the mantissa is a normalized number (i.e., it has no leading zeroes and represents the precision component of a floating point number). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision.

A specialized processing block may efficiently support both single and double-precision floating-point arithmetic, as well as the capability to support single-extended-precision floating-point arithmetic.

As compared to supporting single-precision floating-point operations, supporting double-precision floating-point operations may require twice the interface width but about four times the logic. For example, a mantissa multiplier for a single-precision floating-point operation may require a 24 by 24 multiplication while a double-precision floating-point operation requires a 53 by 53 multiplication. In addition, the increased logic depth (e.g., in partial product compression) and width (e.g., in the final carry-propagate adder) may result in a 20%-30% delay increase in a double-precision floating-point multiplier as compared to a single-precision floating-point multiplier.

In addition, a specialized processing block may contain at least one adder per multiplier (e.g., to support common digital signal processing (DSP) tasks). Therefore a specialized processing block that supports multiple precisions also may support single-precision floating-point addition and double-precision floating-point addition. And as specified above, those adders also could include other circuits such as shifters, count-leading-zeroes units, and "sticky bit" calculators that can be decomposed to support either the single larger addition operation, or two smaller addition operations.

For most DSP algorithms, there is at least one adder per multiplier. Therefore a processing block that supports at least one multiplier and one adder, or a number of multipliers with at least the same number of adders, would be preferred.

Figure 1C:
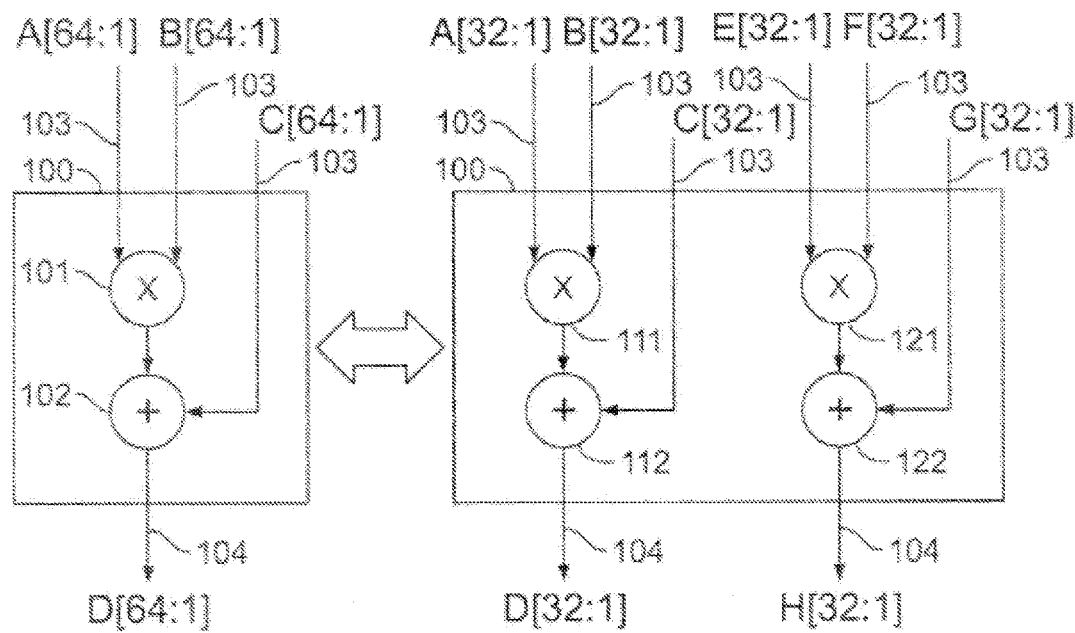
FIG. 1C is a diagram of an illustrative circuit that can be configured as one multiplier/adder pair of a first precision or as two multiplier/adder pairs of a second precision in accordance with an illustrative embodiment of the present invention.

FIG. 1C shows schematically, at a high level, an example of how a specialized processing block 100 may support one double-precision multiplier/adder pair 101/102, or two single-precision, or single-extended-precision, multiplier/adder pairs 111/112 and 121/122 partitioned from multiplier/adder pair 101/102. However, it will be understood that block 100 may be arbitrarily large, and therefore may support additional double-precision multiplier/adder pairs, each of which can be partitioned into two single-precision, or single-extended-precision, multiplier/adder pairs.

One of ordinary skill in the art will understand that many variants of multiplier and/or adder structures will work with specialized processing block 100. As an example, any structure that can be partitioned may be included in a specialized processing block according to the invention, and examples of multiplier and adder structures (including auxiliary structures such as shifters and count-leading-zeroes structures), that can be partitioned in accordance with embodiments of the invention, are shown below.

Specialized processing block 100 also includes sufficient input/output ("I/O") resources to support both the, double-precision multiplier/adder pair or pairs and the larger number of decomposed single-precision or single-extended-precision multiplier/adder pairs. In double-precision mode, multiplier/adder pair 101/102 consumes 192 (3×64) input wires 103 and 64 output wires 104. In two single-precision mode, the block also requires 192 (6×32) input wires 103 and 64 (2×32) output wires 104. The number of wires required for the single-extended-precision mode (not shown) is larger. The precision of a single-extended-precision number is not fixed in the IEEE754 1985 standard, but rather it is just stated as being larger than single precision (and smaller than double-precision). One possible size is a sign bit, a 32 bit mantissa and an 11 bit exponent, for a total of 44 bits. Using those parameters, the number of wires required for two single-extended-precision multiplier/adder pairs would be 264 (6×44) input wires and 88 (2×44) output wires.

Figure 2:
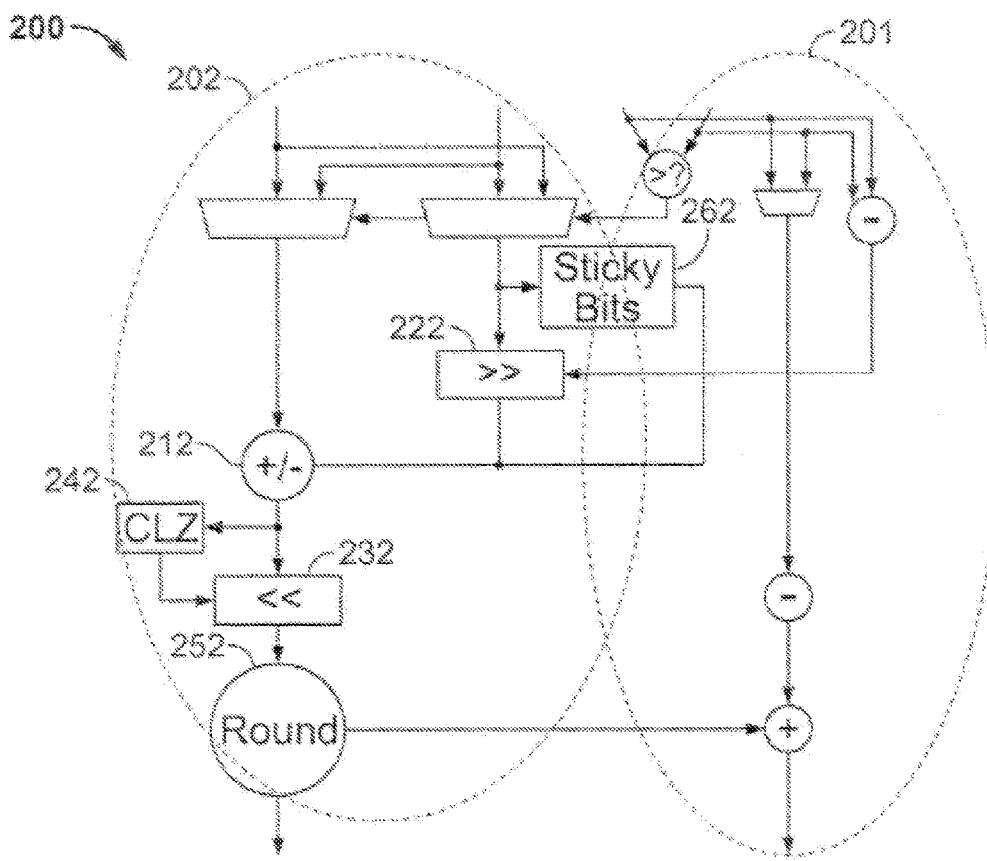
FIG. 2 is a diagram of an illustrative floating-point adder in accordance with an illustrative embodiment of the present invention.

FIG. 2 shows a generic floating-point adder 200, including exponent-handling portion 201 and mantissa-handling portion 202. The sign can be handled by mantissa-handling portion 202. Components of exponent-handling portion 201 are relatively small and inexpensive, and therefore exponent-handling portion 201 can be replicated as many times as are necessary to support the different modes of operation of the specialized processing block. Mantissa-handling portion 202 includes fixed-point adder 212, shifters 222, 232, count-leading-zeroes module 242, rounding module 252 and sticky bit module 262.

Consider the scenario where two floating-point numbers are added together. Mantissa-handling portion 202 may receive the two mantissas and exponent-handling portion 201 the two exponents of the two floating-point numbers.

The exponent-handling portion 201 may compare the two exponents, select the bigger of the two exponents, and compute the difference between the two exponents. Mantissa-handling portion 202 may route the mantissa of the floating-point number with the bigger exponent to fixed-point adder 212 while the mantissa of the floating-point number with the smaller exponent is routed to right shifter 222, where the mantissa is shifted to the right by a number of bit positions that corresponds to the difference between the two exponents. Right shifter 222 may provide the shifted mantissa to fixed-point adder 212, and fixed-point adder 212 may compute the sum of the right shifted mantissa and the mantissa that was routed directly to the fixed-point adder to determine the mantissa of the sum.

The mantissa of the sum may be normalized to establish the leading "1" as required by the IEEE754 1985 standard. For this purpose, the count-leading-zeroes module 242 may determine the position of the first "1" in the sum to identify the implied leading "1" and thereby the number of leading zeroes.

Left shifter 232 may shift the mantissa of the sum a corresponding number of bit positions to the left to obtain a leading "1", which is then eliminated because the leading "1" is implied by the IEEE754 1985 standard. The exponent-handling portion 201 may reduce the bigger exponent by the same number of leading zeroes (i.e., the number of leading zeroes is subtracted from the bigger of the two exponents) as part of the normalization operation.

Any necessary rounding of the normalized floating-point number is performed in rounding module 252. Rounding module 252 may use different rounding schemes. For example, rounding schemes such as round up, round down, round toward zero (which is sometimes also referred to as truncation) or round to the nearest value, where the nearest value may be an integer, an even value, an odd value, or a representable value. Rounding to the nearest value may lead to a tie. In this case, a second round to the nearest value method may be used as a tie breaker. For example, a round to the nearest integer method may be combined with a round to the nearest even method as a tie breaker.

Figure 3:
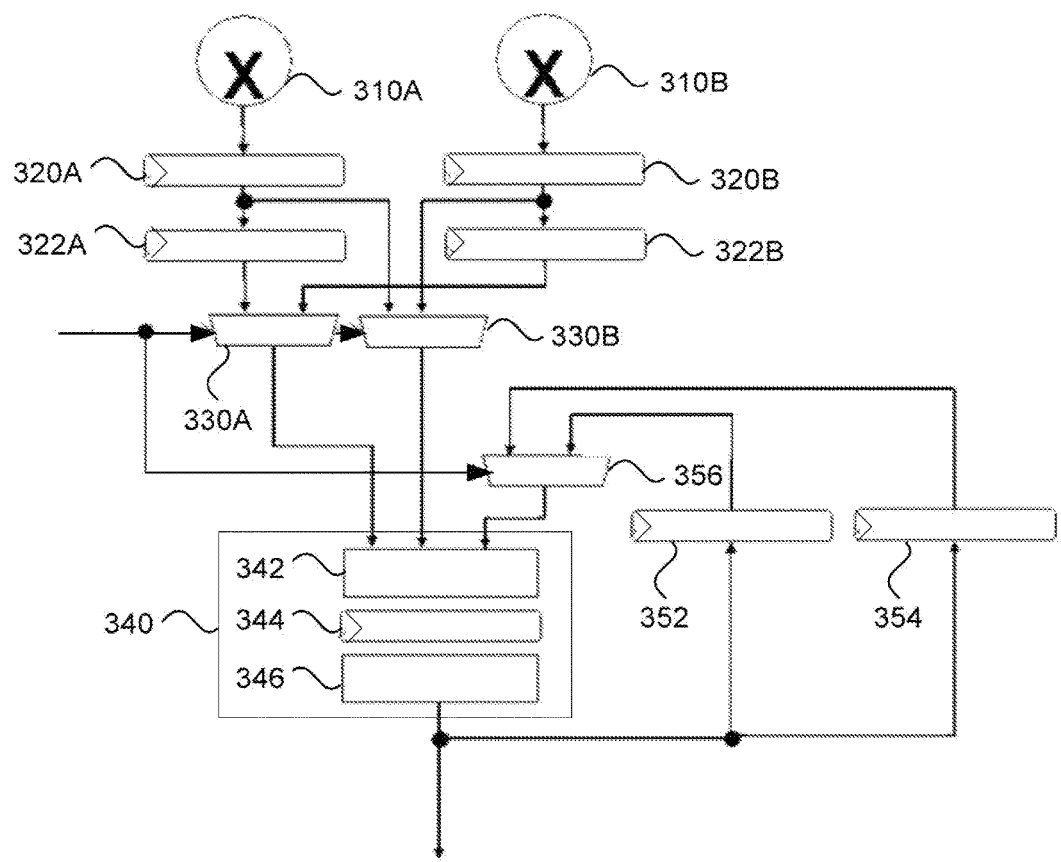
FIG. 3 is a diagram of an illustrative successive multiplier and pipelined floating-point accumulator stages in accordance with an illustrative embodiment of the present invention.

Floating-point adder 200 may include a pipeline register stage to provide for increased clock frequencies and throughput. FIG. 3 shows an embodiment of a specialized processing block that uses a pipelined floating-point adder to implement a pipelined floating-point multiplier-accumulator.

The specialized processing block may include multipliers 310A and 310B, input registers 320A, 320B, 322A, and 322B, accumulator input selectors 330A and 330B, pipelined floating-point adder 340, accumulation registers 352 and 354, and accumulation selector 356. The pipelined floating-point adder may further include a first adder stage 342, a pipeline register stage 344, and a second adder stage 346. If desired, the specialized processing block may include bypass-circuitry to selectively bypass multipliers 310A and 310B.

As shown, the specialized processing block may be configured to accumulate the result of a multiplication every two clock cycles. If desired, the specialized processing block may also be configured to accumulate the result of first and second multiplications, whereby the accumulation result alternates every clock cycle between the accumulation of the first and second multiplications.

For example, consider the scenario in which all registers store signals (i.e., floating-point numbers) at rising clock edges, that the stored signals are available at the output of those registers immediately after a rising clock edge, and that all signals can propagate from one register to the next register within one clock cycle.

Consider further that multiplier 310A produces floating-point numbers A, B, C, D, E, and F which arrive at register 320A before the first, second, third, fourth, fifth, and sixth rising clock edges, respectively. In this scenario, floating-point numbers A and B may be stored in registers 322A and 320A at the second rising clock edge.

A select signal which may be based on the clock signal may select one of the inputs of multiplexers 330A, 330B, and 356. For example, the select signal may select the signals received from registers 320A, 322A, and 352 during a pair number of rising clock edges (i.e., during the second, fourth, sixth, etc. rising clock edges) and the signals received from registers 320B, 322B, and 354 during an impair number of rising clock edges (i.e., during the first, third, fifth, etc. rising clock edges).

An enable signal based on the clock signal may alternate between enabling access to registers 352 and 354. In other words, only one of the registers 352 and 354 may be enabled at any time. For example, the enable signal may enable access to register 352 during the second, fourth, sixth, etc. clock periods and disable access to register 352 during the first, third, fifth, etc. clock periods. Similarly, the enable signal may disable access to register 354 during the second, fourth, sixth, etc. clock periods and enable access to register 354 during the first, third, fifth, etc. clock periods.

Thus, the first adder stage 342 may compute the partial sum of floating-point numbers A and B and the floating point number stored in register 352 (e.g., zero at initialization) and store the result in register 344 at the third rising clock edge. The second adder stage 346 may compute the sum of floating-point numbers A and B (i.e., A+B) and store the result in register 352 at the fourth rising clock edge during which access to register 352 is enabled and access to register 354 is disabled. The sum A+B is also provided at the output of the specialized processing block at the fourth rising clock edge.

At the fourth rising clock edge, registers 322A and 320A may store floating-point numbers C and D, respectively. Next, the first adder stage 342 may compute the partial sum of floating-point numbers C and D and the floating point number stored in register 352 (i.e., A+B) and store the result in register 344 at the fifth rising clock edge. The second adder stage 346 may compute the sum of floating-point numbers C, D, and A+B (i.e., A+B+C+D) and store the result in register 352 at the sixth rising clock edge during which access to register 352 is enabled and access to register 354 is disabled. The sum A+B+C+D is also available at the output of the specialized processing block at the sixth rising clock edge.

At the sixth rising clock edge, registers 322A and 320A may store floating-point numbers E and F, respectively. Next, the first adder stage 342 may compute the partial sum of floating-point numbers E and F and the floating point number stored in register 352 (i.e., A+B+C+D) and store the result in register 344 at the seventh rising clock edge. The second adder stage 346 may compute the sum of floating-point numbers E, F, and A+B+C+D (i.e., A+B+C+D+E+F) and store the result in register 352 at the eighth rising clock edge during which access to register 352 is enabled and access to register 354 is disabled. The sum A+B+C+D+E+F is also available at the output of the specialized processing block at the eighth rising clock edge. Thus, the specialized processing block produces one accumulation result at every other clock cycle.

As another example, consider the example above in which multiplier 310A produces floating-point numbers A, B, C, D, E, and F which arrive at register 320A before the first, second, third, fourth, fifth, and sixth rising clock edges, respectively. Consider further that multiplier 310B produces floating-point numbers L, M, N, O, P, and Q which arrive at register 320B before the second, third, fourth, fifth, sixth, and seventh rising clock edges, respectively.

As in the example above, the specialized processing block may provide the sum A+B at the output after the fourth rising clock edge, the sum A+B+C+D after the sixth rising clock edge, and the sum A+B+C+D+E+F after the eighth rising clock edge.

In addition, floating-point numbers L and M may be stored in registers 322B and 320B at the third rising clock edge. Thus, the first adder stage 342 may compute the partial sum of floating-point numbers L and M and the floating point number stored in register 354 (e.g., zero at initialization) and store the result in register 344 at the fourth rising clock edge. The second adder stage 346 may compute the sum of floating-point numbers L and M (i.e., L+M) and store the result in register 354 at the fifth rising clock edge during which access to register 354 is enabled and access to register 352 is disabled. The sum L+M is also provided at the output of the specialized processing block at the fifth rising clock edge.

At the fifth rising clock edge, registers 322B and 320B may store floating-point numbers N and O, respectively. Next, the first adder stage 342 may compute the partial sum of floating-point numbers N and O and the floating point number stored in register 354 (i.e., L+M) and store the result in register 344 at the sixth rising clock edge. The second adder stage 346 may compute the sum of floating-point numbers N, O, and L+M (i.e., L+M+N+O) and store the result in register 354 at the seventh rising clock edge during which access to register 354 is enabled and access to register 353 is disabled. The sum L+M+N+O is also available at the output of the specialized processing block at the seventh rising clock edge.

At the seventh rising clock edge, registers 322B and 320B may store floating-point numbers P and Q, respectively. Next, the first adder stage 342 may compute the partial sum of floating-point numbers P and Q and the floating point number stored in register 354 (i.e., L+M+N+O) and store the result in register 344 at the eighth rising clock edge. The second adder stage 346 may compute the sum of floating-point numbers P, Q, and L+M+N+O (i.e., L+M+N+O+P+Q) and store the result in register 354 at the ninth rising clock edge during which access to register 354 is enabled and access to register 352 is disabled. The sum L+M+N+O+P+Q is also available at the output of the specialized processing block at the ninth rising clock edge.

Figure 4:
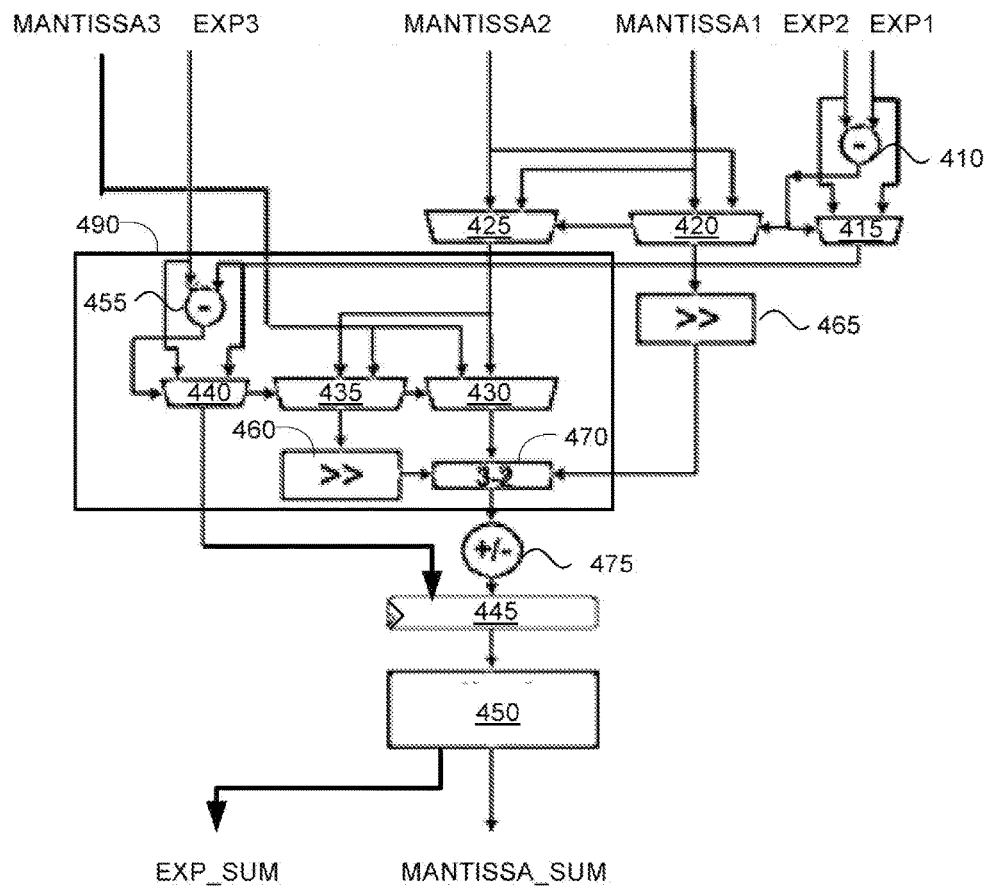
FIG. 4 is a diagram of an illustrative pipelined floating-point adder circuit that computes the sum of three floating-point numbers in accordance with an illustrative embodiment of the present invention.

Thus, the specialized processing block produces two separate accumulation results, whereby each of two accumulation results is alternately provided at the output of the specialized processing block every other clock cycle. As shown, the specialized processing block may include a pipelined three-input floating-point adder circuit. An embodiment of a pipelined three-input floating-point adder circuit such as pipelined floating-point adder 340 is shown in FIG. 4.

The pipelined three-input floating-point adder circuit may include a first selector stage with subtractor 410 and multiplexers 415, 420, and 425, a second selector stage with subtractor 455 and multiplexers 430, 435, and 440, right shifters 460 and 465, 3-2 compressor 470, fixed point adder/subtractor 475, register pipeline stage 445, and normalization/rounding stage 450. The three-input floating-point adder circuit may further include input registers and output registers (not shown).

The register pipeline stage 445 may be placed at any location. For example, the register pipeline 445 may be placed at the inputs of the right shifters and the output of multiplexer 430, at the inputs of 3-2 compressor 470, between the 3-2 compressor 470 and fixed-point adder/subtractor 475, or as shown between fixed-point adder/subtractor 475 and normalization/rounding stage 450.

The three-input floating-point adder circuit may receive three floating-point numbers which are characterized by (sign1 (not shown), exp1, mantissa1), (sign2 (not shown), exp2, mantissa2), and (sign3 (not shown), exp3, mantissa3) with the exponent of the third floating-point number bigger than the exponent of the second floating-point number which in turn is bigger than the exponent of the first floating-point number (i.e., exp3>exp2>exp1). The first selector stage may compute the difference of exp2 and exp1 (i.e., exp2−exp1) and select the bigger of the two exponents (e.g., exp2) in multiplexer 415. The first selector stage may further select the mantissa of the floating-point number with the bigger exponent of exp1 and exp2 (e.g., mantissa2) in multiplexer 425 and the mantissa of the floating-point number with the smaller exponent of exp1 and exp2 (e.g., mantissa1) in multiplexer 420.

Thus, the bigger of exp1 and exp2 is routed to subtractor 455, mantissa2 to multiplexers 430 and 435, and mantissa1 to right shifter 465. Mantissa1 is shifted to the right in right shifter 465 by a number of bit positions that corresponds to the difference between exp2 and exp1 (i.e., exp2−exp1). Right shifter 465 may provide the shifted mantissa to 3-2 compressor 470.

The second selector stage may compute the difference of exp3 and the bigger of exp1 and exp2 as selected by multiplexer 415 (e.g., exp2) in subtractor 455 (i.e., exp3−exp2) and select the bigger of the two exponents (e.g., exp3) in multiplexer 440. The second selector stage may further select the mantissa of the floating-point number with the bigger exponent of exp2 and exp3 (e.g., mantissa3) in multiplexer 430 and the mantissa of the floating-point number with the smaller exponent of exp3 and exp2 (e.g., mantissa2) in multiplexer 435.

Thus, exp3 is routed to register pipeline stage 445, mantissa3 to 3-2 compressor 470, and mantissa2 to right shifter 460. Mantissa2 is shifted to the right in right shifter 460 by a number of bit positions that corresponds to the difference between exp3 and exp2 (i.e., exp3−exp2). Right shifter 460 may provide the shifted mantissa to 3-2 compressor 470.

The right shifted mantissa1 may be further shifted to the right in right shifter 465 by the difference between exp3 and exp2 (i.e., exp3−exp2). The right shifted mantissa may not require the additional shift (e.g., if exp3 is not bigger than exp2).

The fixed-point addition of the three mantissas mantissa3 and the right shifted mantissa2 and mantissa1 may be performed by compressing the three mantissas into two numbers using 3-2 compressor 470, and generating the sum with a carry propagate adder. Other fixed-point adder circuits may be used as well such as ripple-carry adders, carry-save adders, carry-lookahead adders, carry-skip adders, or carry-select adders, just to name a few.

The sum of the fixed-point addition of the three mantissas may be stored in register pipeline stage 445 together with the biggest of the three exponents (e.g., exp3).

Normalization/rounding stage 450 may normalize the sum of the fixed-point addition to establish the leading "1" as required by the IEEE754 1985 standard and perform any necessary rounding of the normalized floating-point number to produce the exponent and mantissa of the sum of the three floating-point numbers.

Although a three-input floating-point addition function is required to implement the pipelined accumulator circuit of FIG. 3, a dedicated three-input floating-point adder circuit as shown in FIG. 3 is not required. Instead, the three-input floating-point adder may be formed from two two-input floating-point adder circuits. For example, two two-input floating-point adder circuits may be cascaded to create the function (A+B)+C. However, a cascade of two two-input floating-point adder circuits may have twice the propagation delay of a single two-input floating-point adder circuit, and therefore be very slow which may negate the effect of the pipelining register.

There are several ways in which two two-input floating-point adder circuits may be combined (e.g., by static or dynamic configuration) to form two independent two-input floating-point adder or one three-input floating-point adder, with approximately the same propagation delay as a dedicated three-input floating-point adder circuit such as the three-input floating-point adder circuit presented in FIG. 4.

Figure 5:
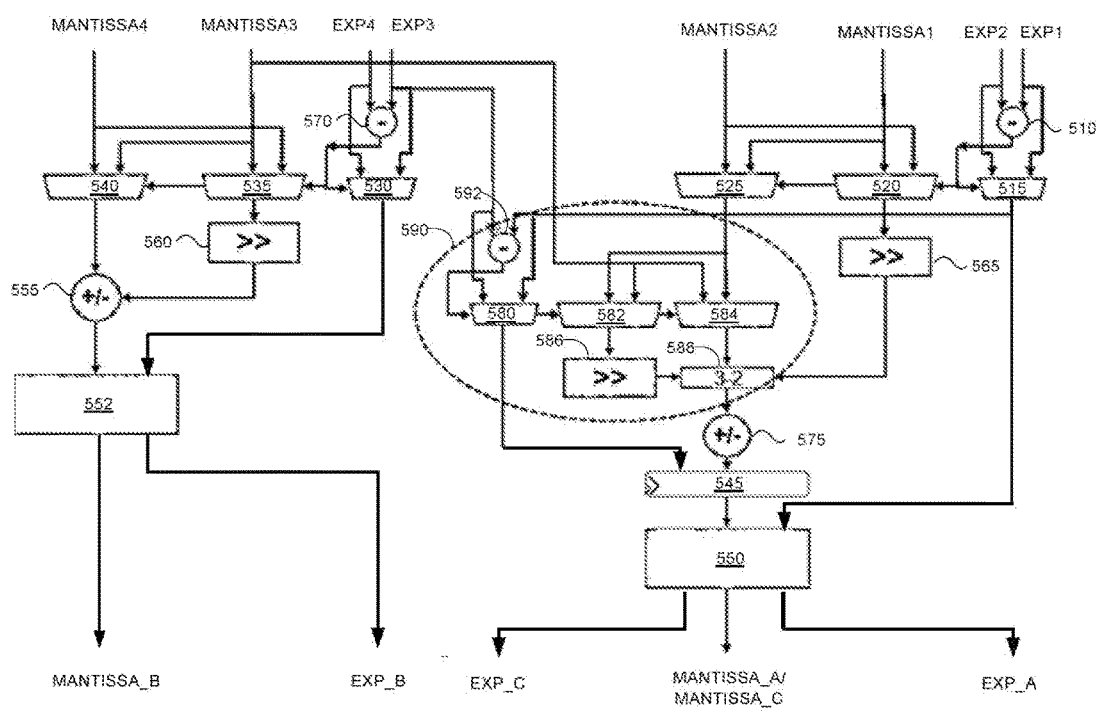
FIG. 5 is a diagram of an illustrative floating-point arithmetic circuit that can be configured to compute two sums of two floating-point numbers or a sum of three floating-point numbers in accordance with an illustrative embodiment of the present invention.

An embodiment of a configurable floating-point adder circuit is shown in FIG. 5. The configurable floating-point adder circuit may operate as a pipelined three-input floating-point adder or as two independent two-input floating point adders. The configurable floating-point adder circuit may include input registers and output registers (not shown).

In the event that the configurable floating-point adder circuit is configured to operate as a pipelined three-input floating-point adder, the configurable floating-point adder circuit may use a first selector stage with subtractor 510 and multiplexers 515, 520, and 525, a second selector stage with subtractor 592 and multiplexers 580, 582, and 584, right shifters 565 and 586, 3-2 compressor 588, fixed point adder/subtractor 575, register pipeline stage 545, and normalization/rounding stage 550.

The three-input floating-point adder operation may receive three floating-point numbers which are characterized by (sign1 (not shown), exp1, mantissa1), (sign2 (not shown), exp2, mantissa2), and (sign3 (not shown), exp3, mantissa3) with the exponent of the second floating-point number bigger than the exponent of the third floating-point number which in turn is bigger than the exponent of the first floating-point number (i.e., exp2>exp3>exp1). The first selector stage may compute the difference of exp2 and exp1 (i.e., exp2−exp1) and select the bigger of the two exponents (e.g., exp2) in multiplexer 515. The first selector stage may further select the mantissa of the floating-point number with the bigger exponent of exp1 and exp2 (e.g., mantissa2) in multiplexer 525 and the mantissa of the floating-point number with the smaller exponent of exp1 and exp2 (e.g., mantissa1) in multiplexer 520.

Thus, exp2 is routed to subtractor 592, mantissa2 to multiplexers 582 and 584, and mantissa1 to right shifter 565. Mantissa1 is shifted to the right in right shifter 565 by a number of bit positions that corresponds to the difference between exp2 and exp1 (i.e., exp2−exp1). Right shifter 565 may provide the shifted mantissa to 3−2 compressor 588.

The second selector stage may compute the difference of exp3 and the bigger of exp1 and exp2 as selected by multiplexer 515 (e.g., exp2) in subtractor 592 (i.e., exp2−exp3) and select the bigger of the two exponents (e.g., exp2) in multiplexer 580. The second selector stage may further select the mantissa of the floating-point number with the bigger exponent of exp2 and exp3 (e.g., mantissa2) in multiplexer 584 and the mantissa of the floating-point number with the smaller exponent of exp3 and exp2 (e.g., mantissa3) in multiplexer 582.

Thus, exp2 is routed to register pipeline stage 545, mantissa2 to 3−2 compressor 588, and mantissa3 to right shifter 586. Mantissa3 is shifted to the right in right shifter 586 by a number of bit positions that corresponds to the difference between exp2 and exp3 (i.e., exp2−exp3). Right shifter 586 may provide the shifted mantissa to 3−2 compressor 588.

The fixed-point addition of the three mantissas mantissa2 and the right shifted mantissa3 and mantissa1 may be performed by compressing the three mantissas into two numbers using 3−2 compressor 588, and generating the sum with a carry propagate adder. Other fixed-point adder circuits may be used as well such as ripple-carry adders, carry-save adders, carry-lookahead adders, carry-skip adders, or carry-select adders, just to name a few.

The sum of the fixed-point addition of the three mantissas may be stored in register pipeline stage 545 together with the biggest of the three exponents (e.g., exp2).

Normalization/rounding stage 550 may normalize the sum of the fixed-point addition to establish the leading "1" as required by the IEEE754 1985 standard and perform any necessary rounding of the normalized floating-point number to produce the exponent (exp_c) and mantissa (mantissa_c) of the sum of the three floating-point numbers.

In the event that the configurable floating-point adder circuit is configured to operate as two independent two-input floating-point adders, mantissa3 may be zero (not shown).

Consider the scenario in which. The first two-input floating-point adder operation may receive floating-point numbers which are characterized by (sign1 (not shown), exp1, mantissa1) and (sign2 (not shown), exp2, mantissa2) and the exponent of the second floating-point number is bigger than the exponent of the first floating-point number (i.e., exp2>exp1). The first selector stage may compute the difference of exp2 and exp1 (i.e., exp2−exp1) and select the bigger of the two exponents (i.e., exp2) in multiplexer 515. The first selector stage may further select the mantissa of the floating-point number with the bigger exponent of exp1 and exp2 (i.e., mantissa2) in multiplexer 525 and the mantissa of the floating-point number with the smaller exponent of exp1 and exp2 (i.e., mantissa1) in multiplexer 520.

Exp2 is routed to normalization/rounding stage 550 or to register pipeline stage 545 in the event that the two-input floating-point adder is configured to be register pipelined. Mantissa1 is routed to right shifter 565. Mantissa1 is shifted to the right in right shifter 565 by a number of bit positions that corresponds to the difference between exp2 and exp1 (i.e., exp2−exp1). Right shifter 565 may provide the shifted mantissa to 3−2 compressor 588. Mantissa2 is routed from multiplexer 525 through multiplexer 584 to 3−2 compressor 588.

3−2 compressor 588 and/or fixed-point adder 575 may compute the sum of the two mantissas, which may be stored in register pipeline stage 545. Normalization/rounding stage 550 may normalize the sum of the fixed-point addition to establish the leading "1" as required by the IEEE754 1985 standard and perform any necessary rounding of the normalized floating-point number to produce the exponent (exp_a) and mantissa (mantissa_a) of the sum of the two floating-point numbers.

The second independent two-input floating-point adder operation may receive floating-point numbers which are characterized by (sign3 (not shown), exp3, mantissa3) and (sign4 (not shown), exp4, mantissa4). Subtractor 570 may compute the difference of exp4 and exp3 (i.e., exp4-exp3) and select the bigger of the two exponents (e.g., exp4) in multiplexer 530. Multiplexer 540 may select the mantissa of the floating-point number with the bigger exponent of exp3 and exp4 (e.g., mantissa4), while multiplexer 535 selects the mantissa of the floating-point number with the smaller exponent of exp3 and exp4 (e.g., mantissa3).

Exp4 is routed to normalization/rounding stage 552. Exp4 may be routed to a register pipeline stage (not shown) in the event that the two-input floating-point adder is configured to be register pipelined. Mantissa4 is routed to fixed-point adder 555 and mantissa3 to right shifter 560. Mantissa3 is shifted to the right in right shifter 560 by a number of bit positions that corresponds to the difference between exp4 and exp3 (i.e., exp4-exp3). Right shifter 560 may provide the shifted mantissa to fixed-point adder 555.

The sum of the two mantissas computed by fixed-point adder 555 may be stored in a register pipeline stage (not shown). Normalization/rounding stage 552 may normalize the sum of the fixed-point addition to establish the leading "1" as required by the IEEE754 1985 standard and perform any necessary rounding of the normalized floating-point number to produce the exponent (exp_b) and mantissa (mantissa_b) of the sum of the two floating-point numbers.

Configurable floating-point adder circuit may also be configured to implement a three-input floating-point adder and a two-input floating-point adder that share one input (i.e., mantissa3 and exp3). The architecture of the configurable floating-point adder circuit may be improved if the configurable floating-point adder circuit can only operate as either one three-input floating-point adder or two independent two-input floating-point adders, but not as both, a three-input floating-point adder and a two-input floating-point adder that share one floating-point number at the same time.

Figure 6:
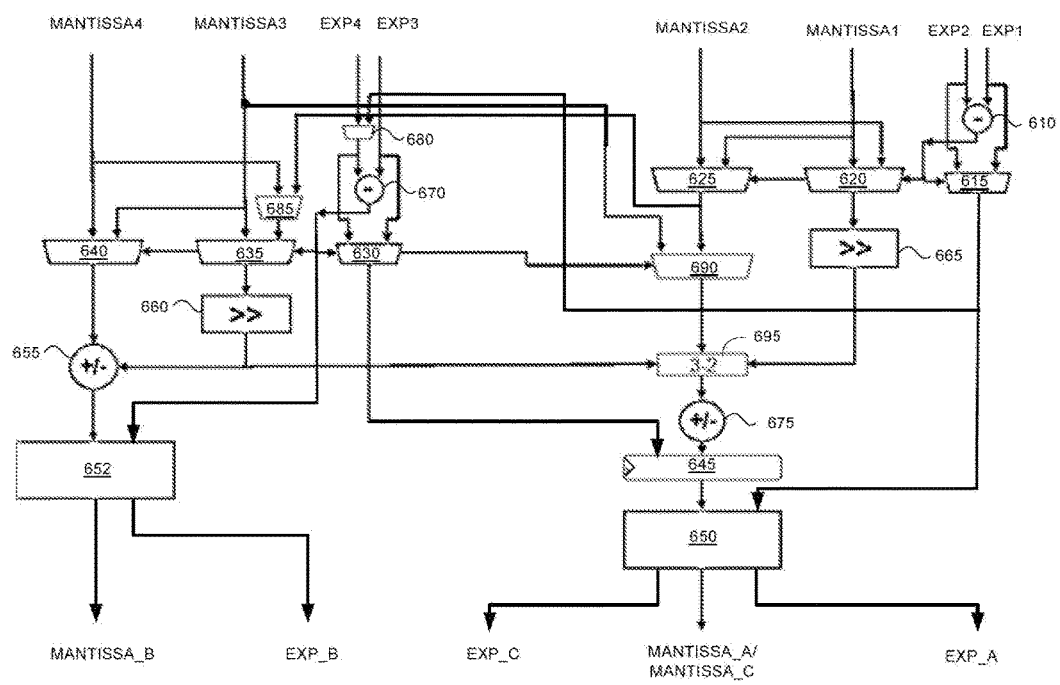
FIG. 6 is a diagram of another illustrative floating-point arithmetic circuit that can be configured to compute two sums of two floating-point numbers or a sum of three floating-point numbers in accordance with an illustrative embodiment of the present invention.

An embodiment of an improved configurable floating-point adder is shown in FIG. 6. In the event that the improved configurable floating-point adder circuit is configured to operate as a pipelined three-input floating-point adder, the configurable floating-point adder circuit may configure multiplexer 680 to select the output of multiplexer 615 (i.e., the bigger of exp2 and exp1) and multiplexer 685 to select the output of multiplexer 625 (i.e., the mantissa of the floating-point number with the bigger exponent of exp2 and exp1).

When the improved configurable floating-point adder circuit is configured to operate as two independent two-input floating-point adders, the configurable floating-point adder circuit may configure multiplexer 680 to select exp4 and multiplexer 685 to select mantissa4.

Figure 7:
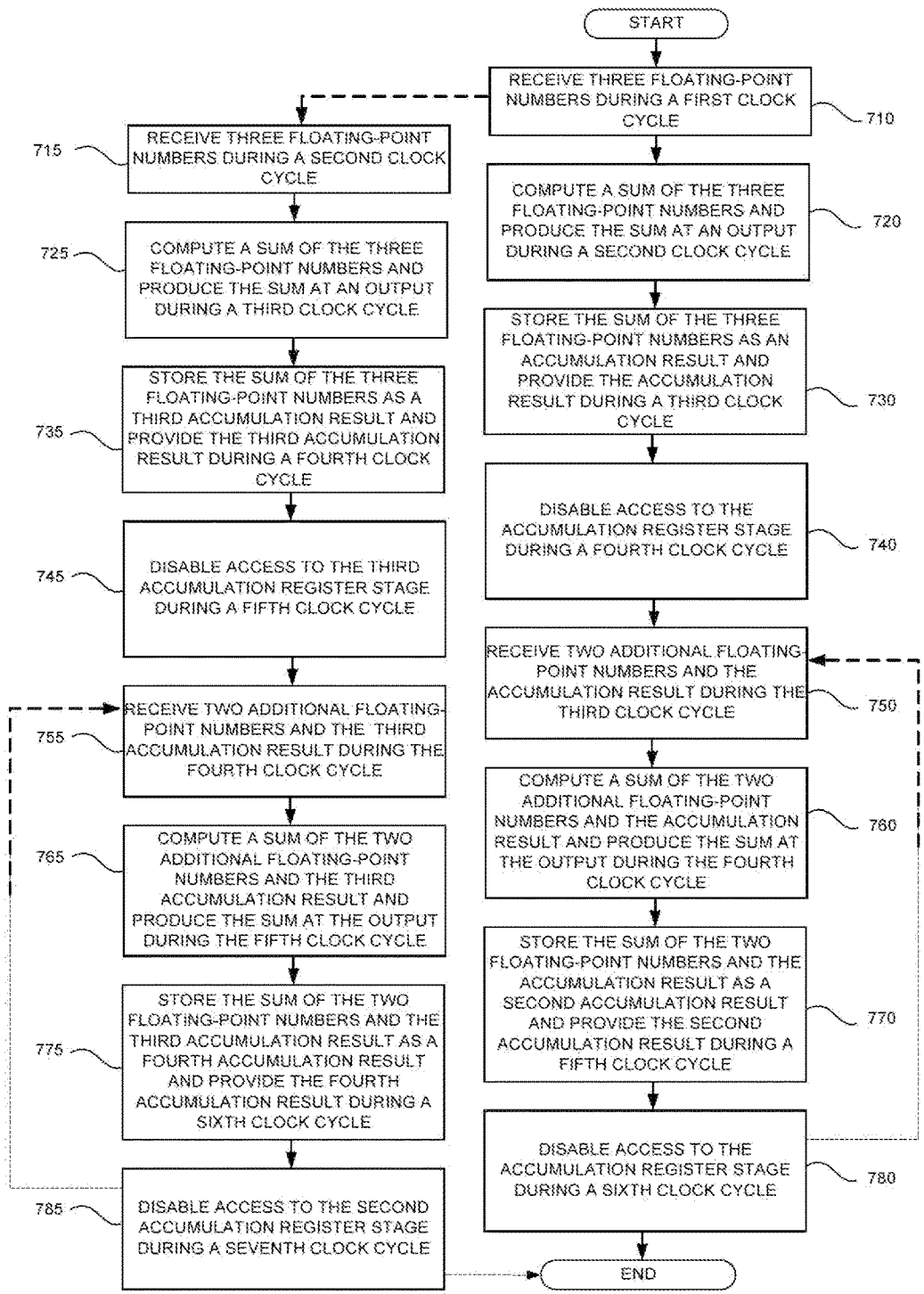
FIG. 7 is a flow chart of illustrative steps for operating a pipelined floating-point accumulator in accordance with an illustrative embodiment of the present invention.

FIG. 7 shows a flow chart of illustrative steps for operating a pipelined floating-point accumulator such as the pipelined floating-point accumulator circuit of FIG. 3. During step 710, the pipelined floating-point accumulator circuit may receive three floating-point numbers during a first clock cycle.

During step 720, the pipelined floating-point accumulator circuit may compute a sum of the three floating-point numbers received during the first clock cycle and produce the sum at an output during a second clock cycle. During step 730, the pipelined floating-point accumulator circuit may store the sum of the three floating-point numbers as an accumulation result and provide the accumulation result during a third clock cycle. During step 740, the pipelined floating-point accumulator circuit may disable access to the accumulation register stage during a fourth clock cycle and receive two additional floating-point numbers and the accumulation result during the third clock cycle (step 750). During step 760, the pipelined floating-point accumulator circuit may compute a sum of the two additional floating-point numbers and the accumulation result and produce the sum at the output during the fourth clock cycle.

During step 770, the pipelined floating-point accumulator circuit may store the sum of the two floating-point numbers and the accumulation result as a second accumulation result and provide the second accumulation result during a fifth clock cycle. During step 780, the pipelined floating-point accumulator circuit may disable access to the accumulation register stage during a sixth clock cycle and optionally return to step 750 for the next accumulation operation.

Optionally, the pipelined floating-point accumulator circuit may receive three additional floating-point numbers during a second clock cycle during step 715. During step 725, the pipelined floating-point accumulator circuit may compute a sum of the three floating-point numbers received during the second clock cycle and produce the sum at an output during a third clock cycle.

During step 735, the pipelined floating-point accumulator circuit may store the sum of the three floating-point numbers as a third accumulation result and provide the third accumulation result during a fourth clock cycle. During step 745, the pipelined floating-point accumulator circuit may disable access to the third accumulation register stage during a fifth clock cycle and receive two additional floating-point numbers and the third accumulation result during the fourth clock cycle (step 755). During step 765, the pipelined floating-point accumulator circuit may compute a sum of the two additional floating-point numbers and the third accumulation result and produce the sum at the output during the fifth clock cycle.

During step 775, the pipelined floating-point accumulator circuit may store the sum of the two floating-point numbers and the third accumulation result as a fourth accumulation result and provide the fourth accumulation result during a sixth clock cycle. During step 785, the pipelined floating-point accumulator circuit may disable access to the second accumulation register stage during a seventh clock cycle and optionally return to step 755 for the next accumulation operation.

The method and apparatus described herein may be incorporated into any suitable integrated circuit or system of integrated circuits. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable integrated circuits (EPLDs), electrically erasable programmable integrated circuits (EEPLDs), logic cell arrays (LCAs), field programmable gate arrays (FPGAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. Circuitry that performs pipelined floating-point accumulation operations, comprising:
   a pipelined floating-point adder having a plurality of inputs and an adder output, wherein the pipelined floating-point adder receives first, second, and third floating-point numbers each having an exponent and a mantissa of a given precision at first, second, and third adder inputs of the plurality of inputs, and wherein the pipelined floating-point adder computes a pipelined floating-point sum and provides the pipelined floating-point sum at the adder output; and
   an accumulation register stage having a register input and a register output, wherein the register input is coupled to the adder output and the register output is coupled to only the third adder input, wherein the accumulation register stage receives the pipelined floating-point sum from the adder output, stores the received pipelined floating-point sum, and provides the stored pipelined floating-point sum as the third floating-point number to the third adder input.

2. The circuitry of claim 1, further comprising:
   an additional accumulation register stage having a register input and a register output, wherein the additional accumulation register stage receives an additional pipelined floating-point sum from the adder output at the register input and stores the additional pipelined floating-point sum.

3. The circuitry of claim 2, further comprising:
   a control circuit coupled to the accumulation register stage and the additional accumulation register stage, wherein the control circuit enables access to the accumulation register stage over a first duration of time and to the additional accumulation register stage over a second duration of time.

4. The circuitry of claim 2, further comprising:
a clock input that receives a clock signal having a clock period; and
a select signal generator circuit that receives the clock signal from the clock input and generates a select signal based on the clock signal.

5. The circuitry of claim 4, further comprising:
a multiplexer coupled between the accumulation register stage, the additional accumulation register stage, and the third adder input, wherein the multiplexer receives the select signal from the select signal generator circuit, the stored pipelined floating-point sum from the accumulation register stage, and the additional pipelined floating-point sum from the additional accumulation register stage and outputs a selected one of the received floating-point sums based on the select signal.

6. The circuitry of claim 4, further comprising:
an input selection circuit coupled to the first and second adder inputs, wherein the input selection circuit receives the select signal and a plurality of floating-point numbers, wherein the input selection circuit selects two floating-point numbers of the plurality of floating-point numbers based on the select signal, and conveys each of the selected two floating-point numbers to a respective one of the first and second adder inputs.

7. The circuitry of claim 6, further comprising:
a plurality of registers coupled to the input selection circuit, wherein each of the plurality of registers stores a floating-point number and conveys the stored floating-point number to the input selection circuit.

8. The circuitry of claim 1, wherein the pipelined floating-point adder further comprises:
a first floating-point adder stage that receives the first, second, and third floating-point numbers, wherein the first floating-point adder stage computes a partial mantissa result and a partial exponent result based on the received first, second, and third floating-point numbers;
a pipeline register stage coupled to the first floating-point adder stage, wherein the pipeline register stage receives the partial exponent result and the partial mantissa result from the first floating-point adder stage and stores the received partial exponent result and the received partial mantissa result; and
a second floating-point adder stage that receives the stored partial mantissa result and the stored partial exponent result from the pipeline register stage and computes a final mantissa result and a final exponent result based on the stored partial mantissa result and the stored partial exponent result.

9. The circuitry of claim 8, wherein the first floating-point adder stage further comprises:
a subtractor circuit that receives first and second exponents of the first and second floating-point numbers and computes a right shift amount based on a difference between first and second exponents.

10. The circuitry of claim 9, further comprising:
a right shifter that receives first and second mantissas of the first and second floating-point numbers, and wherein the right shifter shifts one of the first and second mantissas by the computed right shift amount.

11. The circuitry of claim 8, wherein the second floating-point adder stage further comprises:
a rounding circuit that performs a rounding operation on the stored partial mantissa result and adjusts the stored partial mantissa result based on the rounding operation.

12. The circuitry of claim 8, wherein the second floating-point adder stage further comprises:
a normalization circuit that receives the stored partial mantissa result and the stored partial exponent result, wherein the normalization circuit converts the stored partial mantissa result in accordance with a standard requiring an implied leading bit and adjusts the stored partial exponent result based on the conversion of the stored partial mantissa result.

13. A method for performing floating-point operations on an integrated circuit that is controlled by a clock signal, comprising:
receiving three floating-point numbers during a first clock cycle of the clock signal;
with a pipelined floating-point arithmetic circuit, computing a sum of the three floating-point numbers and producing the sum at an output of the pipelined floating-point arithmetic circuit during a second clock cycle of the clock signal;
with an accumulation register stage, storing the sum of the three floating-point numbers as an accumulation result and providing the accumulation result at an output of the accumulation register stage during a third clock cycle of the clock signal; and
disabling access to the accumulation register stage during a fourth clock cycle of the clock signal.

14. The method of claim 13, further comprising:
receiving two additional floating-point numbers and the accumulation result during the third clock cycle; and
with the pipelined floating-point arithmetic circuit, computing a sum of the two additional floating-point numbers and the accumulation result and producing the sum at the output of the pipelined floating-point arithmetic circuit during the fourth clock cycle.

15. The method of claim 14, further comprising:
with the accumulation register stage, storing the sum of the two additional floating-point numbers and the accumulation result as a second accumulation result and providing the second accumulation result at the output of the accumulation register stage during a fifth clock cycle of the clock signal; and
disabling access to the accumulation register stage during a sixth clock cycle of the clock signal.

16. The method of claim 13, further comprising:
receiving three additional floating-point numbers during the second clock cycle;
with the pipelined floating-point arithmetic circuit, computing a sum of the three additional floating-point numbers and producing the computed sum of the three additional floating-point numbers at the output of the pipelined floating-point arithmetic circuit during the third clock cycle.

17. The method of claim 16, further comprising:
disabling access to an additional accumulation register stage during the third clock cycle;
with the additional accumulation register stage, storing the computed sum of the three additional floating-point numbers as an additional accumulation result and providing the accumulation result at an output of the additional accumulation register stage during the fourth clock cycle; and
disabling access to the additional accumulation register stage during a fifth clock cycle of the clock signal.

18. The method of claim 13, wherein computing the sum of the three floating-point numbers and producing the sum at the output of the pipelined floating-point arithmetic circuit during the second clock cycle of the clock signal further comprises:

with a first portion of the pipelined floating-point arithmetic circuit, executing a first portion of an addition operation to produce a partial sum of the three floating-point numbers;

with a pipeline register stage, storing the partial sum; and with a second portion of the pipelined floating-point arithmetic circuit, executing a second portion of the addition operation using the stored partial sum to produce the sum of the three floating-point numbers.

19. The method of claim 18, wherein executing the first portion of the addition operation to produce the partial sum of the three floating-point numbers further comprises:

computing a difference between first and second exponents of first and second floating-point numbers the three floating-point numbers; and right shifting a mantissa of the first and second floating-point numbers by a number of bits that is based on the difference between first and second exponents of first and second floating-point numbers the three floating-point numbers.

20. Fused floating-point arithmetic circuitry, comprising:

a first floating-point adder that receives a first floating-point number having a first mantissa and a first exponent and a second floating-point number having a second mantissa and a second exponent, wherein the first floating-point adder computes a first sum of the received first and second floating-point numbers;

a second floating-point adder that receives a third floating-point number having a third mantissa and a third exponent and a fourth floating-point number having a fourth mantissa and a fourth exponent, wherein the second floating-point adder computes a second sum of the received third and fourth floating-point numbers; and a fuse circuit coupled to the first and second floating-point adders, wherein the fuse circuit, in a first mode, combines the first and second floating-point adders to produce the first sum based on the first and second floating-point numbers and the second sum based on the third and fourth floating-point numbers and, in a second mode, combines the first and second floating-point adders to produce a third sum based on the first, second, and third floating-point numbers.

21. The circuitry of claim 20, wherein the fuse circuit further comprises:

a first selector circuit that receives the fourth exponent and receives a bigger of the first and second exponents, wherein the first selector circuit selects the fourth exponent in the first mode and the bigger of the first and second exponents in the second mode.

22. The circuitry of claim 20, wherein the fuse circuit further comprises:

a second selector circuit that receives the fourth mantissa and one of the first and second mantissas, wherein the second selector circuit selects the fourth mantissa in the first mode and the one of the first and second mantissas in the second mode.

23. The circuitry of claim 20, wherein the fuse circuit further comprises:

a third selector circuit that receives the third mantissa and one of the first and second mantissas, wherein the third selector circuit produces an un-shifted mantissa by selecting between the third mantissa and the one of the first and second mantissas based on a comparison of the first, second, and third exponents.

24. The circuitry of claim 23, further comprising:

a three-to-two compressor that receives the un-shifted mantissa and two right-shifted mantissas of the first, second, and third mantissas, wherein the three-to-two compressor further performs a compression operation on the received mantissas.

* * * * *